April 1, 1969 P. I. WAJS 3,436,559

STATIC FUNCTION GENERATOR

Filed Oct. 23, 1965 Sheet 1 of 2

INVENTOR.
PHILIP I. WAJS
BY John F. Lukas
ATTORNEY

INVENTOR.
PHILIP I. WAJS

BY John F. Luhrs

ATTORNEY

United States Patent Office 3,436,559
Patented Apr. 1, 1969

3,436,559

STATIC FUNCTION GENERATOR

Philip I. Wajs, Euclid, Ohio, assignor to Bailey Meter Company, a corporation of Delaware Filed Oct. 23, 1965, Ser. No. 503,529
Int. Cl. G06g 7/12
U.S. Cl. 307—229 18 Claims

ABSTRACT OF THE DISCLOSURE

A feedback diode type function generator with a preselected transfer characteristic for input signals varying plus and minus of zero including a differential amplifier, a source of direct current voltage for adding a fixed voltage level to the input signal before amplification and for subtracting a fixed voltage level from the output signal, a resistive feedback loop for proportionally relating the output signal with the input signal and a plurality of diode feedback loops for changing the proportional relationship between the output and input signals. A power amplifier is connected to the output of the differential amplifier and a temperature compensating diode is connected to the output of the power amplifier in series opposition with the feedback diodes and in series with the resistive loop in order to minimize the effect of a temperature change in the feedback diodes. The voltage source back-biases the feedback diodes and forward-biases the temperature compensating diode to generate either an increasing or a decreasing transfer characteristic slope.

This invention relates to a function generator. In particular, this invention relates to a function generator having one power supply for biasing input and output signals varying plus and minus of zero.

Function generators are widely used in modern control systems where the control signal is not related to the measured variable by a first order equation. For example, control of a boiler in a central power station requires the use of function generators. The usual method of determining the rate of steam flow is by developing a differential pressure across an orifice restriction. A differential pressure transmitted responds to the pressure difference created and generates a signal proportional thereto. Unfortunately, the relationship between differential pressure and fluid flow follows the square root curve; thus the output of a transmitter must be squared to be useful.

There are many types of function generators commercially available, some are sophisticated devices with exotic transistorized feedback networks that are capable of producing a desired curve within a fraction of a percent. Such devices are usually quite expensive and not necessarily suitable for use in all applications. Function generators having diode feedback circuits that produce a segmented type output signal are usually adequate for many control systems. To generate the desired input-output relationship with a feedback diode type function generator, each diode is biased to be nonconducting above or below (depending on the desired output signal slope) a given output signal level.

My invention uses an amplifier with a feedback diode network to generate the desired input-output relationship for signals varying plus and minus of zero. In the function generator I have invented, a single regulated source of D.C. voltage adds a fixed voltage to the plus and minus of zero input and output signals. Prior art function generators for signals passing through zero use two power supplies.

Another shortcoming of prior diode-type function generators was their extremely wide temperature drift characteristic. A feature of my invention is the overcoming of this temperature drift error by use of a compensating diode in series with the feedback diodes.

Thus, an object of my invention is to provide a diode-type function generator using one power supply to bias both the input and output signals.

Another object of my invention is to provide a function generator having one power supply to bias the feedback diodes, the input signal and the output signal.

Still another object of my invention is to provide a function generator having diode temperature compensation.

Other objects and advantages of my invention will be apparent from the following description in conjunction with the drawings wherein.

Throughout my description I will, wherever possible, use the same reference number to identify identical parts in different figures.

Figure 1:
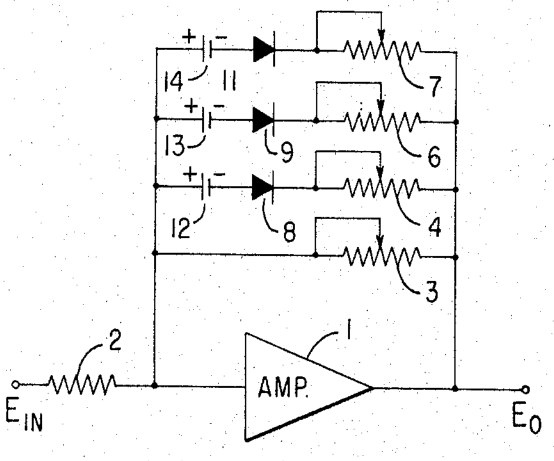
FIG. 1 is a schematic diagram of a prior art feedback diode function generator.

Referring to FIG. 1, I show an operational amplifier 1, either transistorized or vacuum tube, having an output signal $E_o$ and an input signal $E_{in}$. An input resistor 2 is connected to the input terminal of the operational amplifier 1. Connected to the amplifier output terminal is a parallel array of adjustable resistors (potentiometers) 3, 4, 6 and 7 that provide a means for obtaining the desired relationship between the input signal $E_{in}$ and output signal $E_o$. Adjustable resistor 3 also connects to the amplifier input and the adjustable resistors 4, 6 and 7 connect to the cathode electrodes of diodes 8, 9 and 11 respectively. Connected to the anode electrode of the diodes 8, 9 and 11 are the negative terminals of direct current supplies 12, 13 and 14 respectively. The positive terminals of the direct current supplies are interconnected and in turn connect to the amplifier input.

In operation of FIG. 1, assume that the output voltage $E_1$ of the power supply 12 is less than the output voltage $E_2$ of the power supply 13 which in turn is less than the output voltage $E_3$ of the power supply 14. With the circuit of FIG. 1, the input signal $E_{in}$ and the output signal $E_o$ cannot vary plus and minus of zero; one will, however, have the reverse polarity of the other. A positive going input signal $E_{in}$ results in a negative going output signal $E_o$; when $E_o$ is less negative than $E_1$ the output signal varies in accordance with the following equation:

$$E_o = -R_3/R_2(E_{io})$$

where $R_3$ and $R_2$ are the resistive values of the adjustable resistor 3 and the input resistor 2 respectively. As the output voltage $E_o$ goes more negative than $E_1$, diode 8 is forward biased and the output is related to the input by the following equation:

$$E_o = -\frac{R_3R_4}{R_2(R_3+R_4)}(E_{IN})$$

where $R_4$ is the resistive value of the adjustable resistor 4. Next, diode 9 becomes forward biased when the output signal goes more negative than $E_2$; diode 10 is forward biased when the output signal goes more negative than $E_3$. As each successive diode becomes forward biased the closed loop amplifier gain $E_o/E_{in}$ decreases by the addition of another paralleled feedback resistor, this is known as a decreasing slope function. An increasing slope function can be obtained with the circuit of FIG. 1 by reversing the polarity of the power supplies 12, 13 and 14 and reversing the diodes 8, 9 and 11.

Figure 1A:
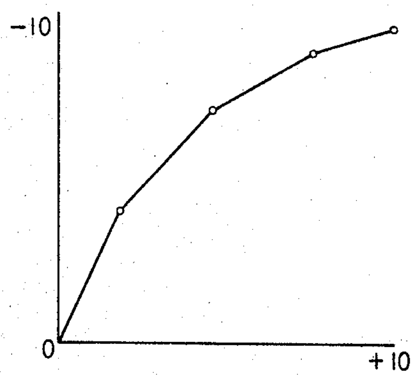
FIG. 1A is a plot of $E_o$ vs. $E_{in}$ for the circuit of FIG. 1.

The functional relationship between the output signal and the input signal of the circuit of FIG. 1 is shown in FIG. 1A. Where one straight line segment intersects another straight line segment is known as a break point, it indicates a change in slope of the output signal and the forward biasing of another feedback diode. The location of the break points are determined by the magnitude of $E_1$, $E_2$, and $E_3$. It should be pointed out that the plot of FIG. 1A is only valid when the input and output signals do not vary plus and minus of zero. This is essential for the successful operation of the circuit of FIG. 1.

Figures 2, 3, 4A:
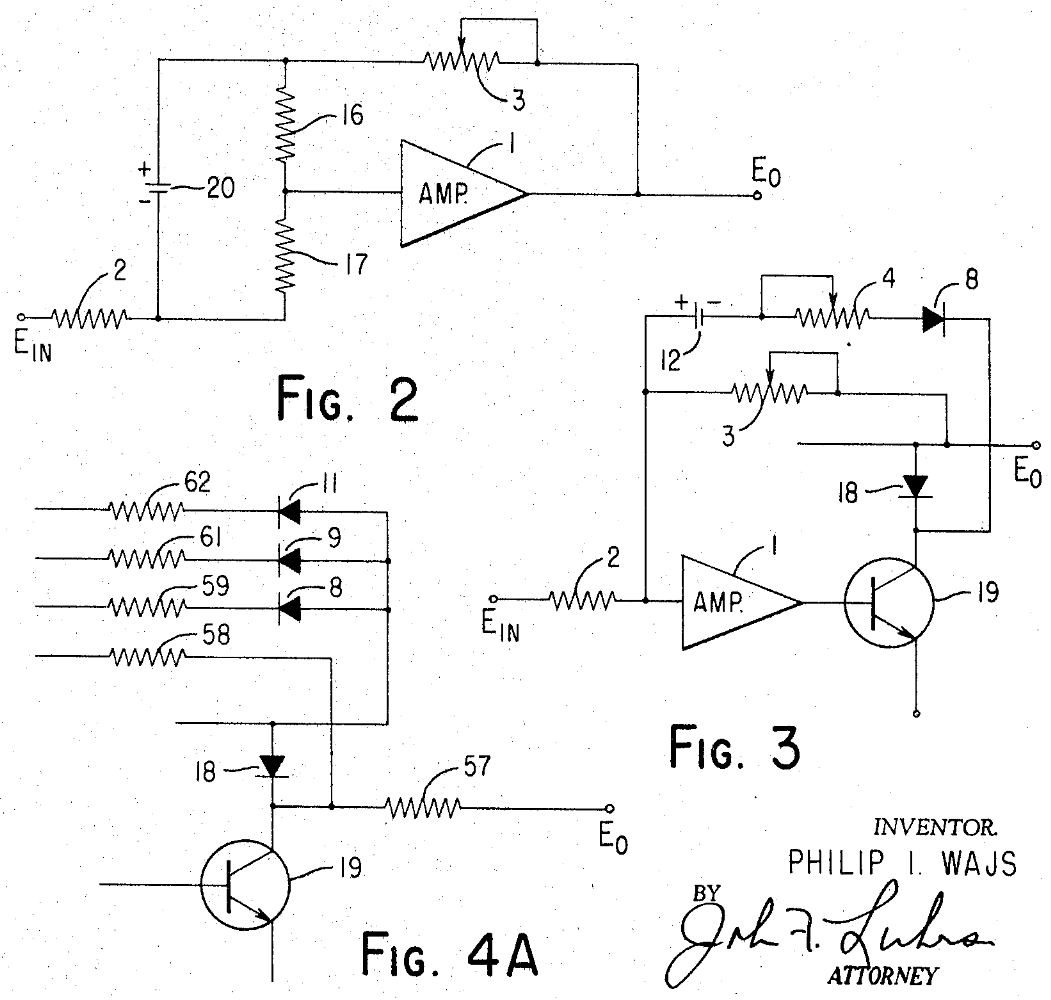
FIG. 2 is a schematic diagram of a feedback diode function generator for input and output signals that vary plus and minus of zero.
FIG. 3 is a schematic diagram of a feedback diode function generator with temperature stabilization.
FIG. 4A shows the feedback diode arrangement for an increasing slope output signal.

Many analog control systems employ signals, however, which vary plus and minus of zero; there are many inherent advantages to such zero centered control signal. When a control signal that passes through zero must be characterized a small problem does arise, the operational amplifier input signal must be biased to vary only on one side of zero and not pass through it. Referring to FIG. 2, I show a circuit for biasing a plus and minus of zero input signal to vary on one side of zero. The same supply that biases the input signal also biases the output signal to vary through zero thereby maintaining a control signal throughout a system that varies plus and minus of zero.

In particular, I show an operational amplifier 1 having an output terminal connected to an adjustable resistor 3 in series with an output bias resistor 16. The output bias resistor 16 connects to the amplifier input terminal, also connected to the amplifier input is an input bias resistor 17 in series with an input resistor 2. Connected in parallel with the input bias resistor 17 and the output bias resistor 16 is a regulated direct current supply 20, shown here as a battery. To bias the output signal down the same amount as the input is biased up, the bias resistors 16 and 17 must be fairly well matched resistance wise. Also, they should have a low resistive value in comparison with that of the adjustable resistor 3 and the input resistor 2 in order not to influence the closed loop amplifier gain. The transfer function of the circuit shown in FIG. 2 is:

$$E_o=-\frac{R_3}{R_2}[E_{IN}+E_{17}]E_{16}$$

where $E_{16}$ is the voltage drop across the input bias resistor 16, $E_{17}$ is the voltage drop across the output bias resistor 17.

In a circuit with the above transfer function, it is important that the power supply generating the $E_{16}$ and $E_{17}$ terms be regulated since the $E_{17}$ voltage is multiplied by the amplifier closed loop gain. If $E_{16}$ equals $E_{17}$, then the output signal $E_o$ will be biased in one polarity the same amount as the input signal $E_{in}$ is biased in the opposite polarity. The system of FIG. 2 in combination with the system of FIG. 1 results in a function generator that is capable of characterizing an input signal that varies plus and minus of zero.

One problem often encountered when using a diode feedback type function generator, is the variation in voltage drop across a diode due to changes in ambient temperature. Referring to FIG. 3, I show a temperature compensating diode 18 in the collector electrode circuit of an output transistor 19. Connected to the anode electrode of the compensating diode 18 is an adjustable resistor 3, connected to the diode's cathode terminal is a feedback diode 8. The system of FIG. 3 is somewhat similar to that of FIG. 1, it includes an operational amplifier 1 having an output terminal connected to the base electrode of transistor 19 and an input terminal connected to an input resistor 2. Also connected to the amplifier input terminal is the adjustable resistor 3 and the positive terminal of a power supply 12, shown here as a battery. The negative terminal of the power supply 12 connects to an adjustable resistor 4 in series with the feedback diode 8.

With the output signal $E_o$ less negative than the voltage of power supply 12, the output would vary in accordance with the well-known equation $E_o=-R_3/R_2(E_{in})$. When the output signal $E_o$ is more negative than the voltage of power supply 12 the summation of currents at the amplifier input terminal would be:

$$\frac{E_{IN}}{R_2}+\frac{E_o}{R_3}+\frac{E_o-V_8+V_{18}}{R_4}=0$$

where $V_8$ equals the voltage drop of the feedback diode, and $V_{18}$ equals the voltage drop of the compensating diode 18.

A change in ambient temperature results in the feedback diode voltage drop changing by an amount $\Delta V_8$ and the compensating diode voltage drop changing by an amount $\Delta V_{18}$. The equation for the output signal $E_o$ would include these $\Delta V$ voltages, they would be added to the $V_8$ and $V_{18}$ terms as follows:

$$E_o=-\frac{R_4R_3}{R_2(R_4+R_3)}E_{in}+\frac{R_3}{(R_3+R_2)}[(V_8+\Delta V_8)-(V_{18}+\Delta V_{18})]$$

Thus, for any temperature change, the change in feedback diode voltage drop will be cancelled by an equal but opposite change in the compensating diode voltage drop. To further eliminate the effect of ambient temperature change any difference between $\Delta V_8$ and $\Delta V_{18}$ is multiplied by $R_3/(R_3+R_2)$. Additional feedback diode networks will also be temperature compensated by the compensating diode 18. Each additional feedback diode loop adds a term to the above equation which is similar to:

$$\frac{R_3}{R_3+R_2}[(V_8+\Delta V_8)-(V_{18}-\Delta V_{18})]$$

Figure 4:
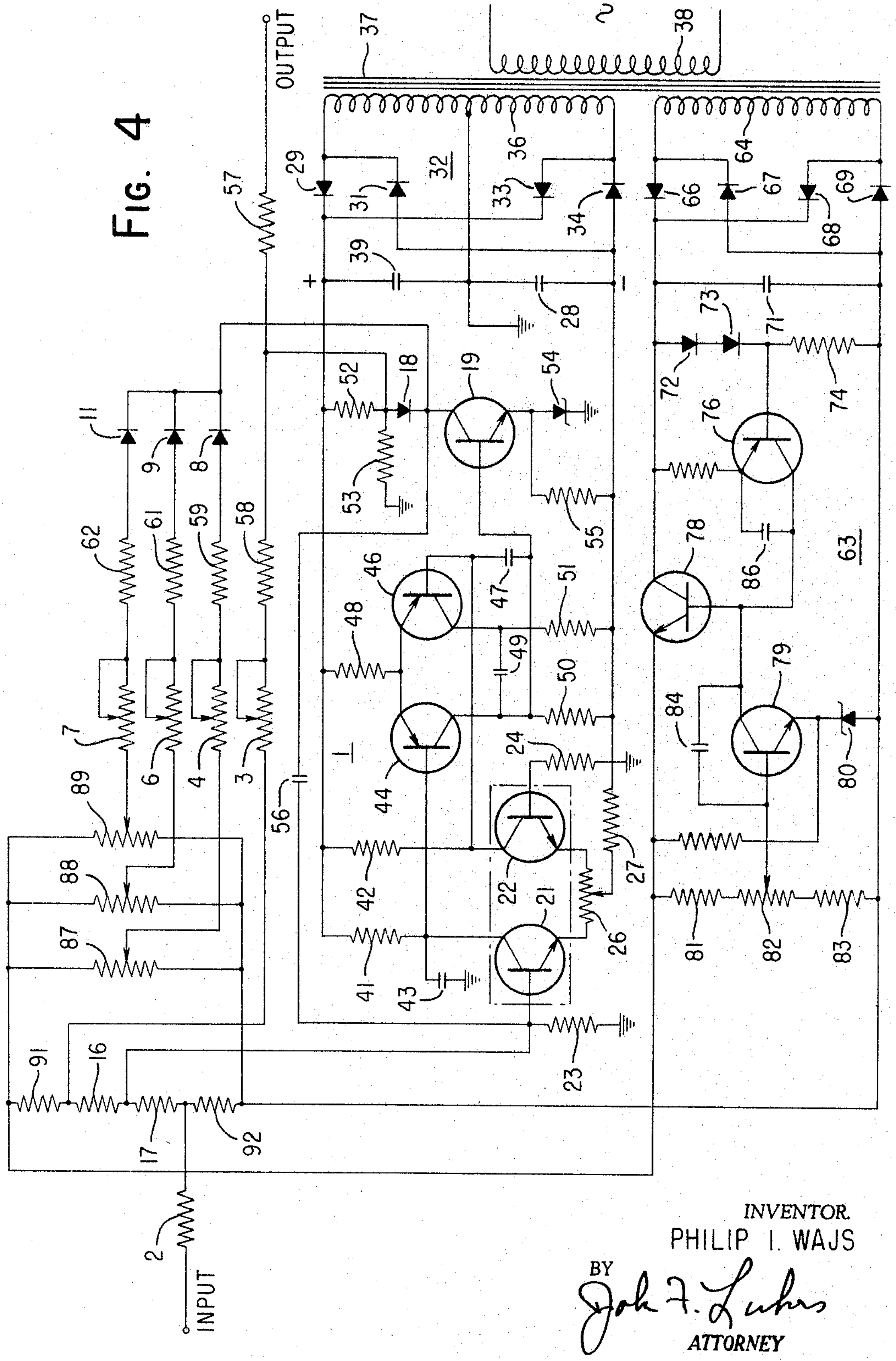
FIG. 4 is a schematic diagram of a transistorized function generator having a decreasing slope output signal.

Referring to FIG. 4, I show a transistorized function generator employing one regulated power supply for biasing the input signal, the output signal and the feedback diodes. In particular, I show an amplifier 1 having a first differential amplifying stage consisting of transistors 21 and 22 each having base, emitter and collector electrodes. For good thermal tracking of each transistor with the other, they are enclosed in the same envelope. The base electrode of the transistor 21 connects to a bias resistor 23 and to the junction of the input bias resistor 17 and the output bias resistor 16. A bias resistor 24, having an effective resistance equal to the base resistance of the transistor 21, is connected to the base electrode of transistor 22 and to ground. Connected to the emitter electrode of transistor 21 and transistor 22 is a null-balance potentiometer 26 having its wiper arm in series with a bias resistor 27 connected to a direct current supply 32.

The direct current supply 32 is of a standard design and includes diodes 29, 31, 33 and 34 connected in a bridge circuit. Alternating current is supplied to the bridge by means of a transformer 37 having a center-tap secondary winding 36 and a primary winding 38. The primary winding 38 connects to a source of A.C. voltage and the center-tap secondary winding 36 is connected to the bridge diodes 29, 31, 33 and 34. Two filter capacitors are connected in series between the positive and negative terminals of the bridge, filter capacitor 28 filters the negative side of the power supply and filter 39 filters the positive side. The junction of filter capacitor 28 with filter capacitor 39 connects to the center-tap of the secondary winding 36 and to ground. Using the direct current supply as shown, both positive and negative bias voltages are generated for use in the amplifying stages.

In addition to supplying a negative voltage to the emitter electrodes of transistors 21 and 22, the direct current supply 32 also provides a positive voltage to the collector electrodes of these transistors through collector bias resistors 41 and 42.

The amplifier 1 includes a second differential amplifying stage consisting of transistors 44 and 46 each having a base, emitter and collector electrode. The base electrode of transistor 44 is direct coupled to the collector electrode of transistor 21 and the base electrode of transistor 46 is direct coupled to the collector electrode of transistor 22. Also connected to the base electrode of transistor 46 is a high frequency stabilizing capacitor 47. A bias resistor 48, connected to the power supply 32 and the emitter electrodes of transistors 44 and 46, supplies the necessary emitter bias voltage to the second differential stage. For frequency stabilization, a capacitor 49 interconnects the collector electrodes of transistors 44 and 46. Collector bias resistors 50 and 51 connect to the collector electrodes of transistors 44 and 46 and to the direct current supply 32; they provide the necessary collector bias voltage for proper transistor action. For additional high frequency stabilization, the collector electrode of transistor 44 is connected to the capacitor 47.

The output stage of the amplifier 1 consists of an output transistor 19 having a base electrode direct coupled to the collector electrode of transistor 44. For low frequency noise filtering, a filter capacitor 56 ties the collector electrode of the transistor 19 with the base electrode of transistor 21. Also connected to the collector electrode of the transistor 19 is a temperature compensating diode 18. To prevent the output signal $E_o$ from exceeding given limits a voltage divider, including resistors 52 and 53, provides a collector bias voltage to the transistor 19 through the compensating diode 18. The emitter electrode circuit of transistor 19, includes a bias resistor 55 connected to the direct current supply and a Zener diode 54 connected to ground. In addition to providing the proper emitter bias voltage, the Zener diode 54 also provides a low impedance emitter circuit.

An amplifier of the type described has good temperature stability when the base resistance of transistors 21 and 22 have substantially the same effective resistance. The use of two differential amplifiers in cascade provides high gain and low sensitivity to direct current supply voltage variation. High frequency stabilization is obtained by the use of capacitors 43, 47 and 49 connected as shown.

Depending on whether an output signal with an increasing slope or decreasing slope is desired, an output resistor 57 will be connected to either the anode or cathode of the compensating diode 18. The circuit shown in FIG. 4 would generate a decreasing slope characteristic and the output signal would be taken from the anode electrode of the compensating diode 18. In addition to the output resistor 57, a feedback resistor 58 in series with an adjustable resistor 3 also connects to the anode of the compensating diode 18. To bias the ouput signal to vary plus and minus of zero, the adjustable resistor 3 is in series with the output bias resistor 16. When the output signal is taken from the anode electrode of diode 18 the diode feedback network must be connected to the cathode electrode for proper temperature stabilization. As described in FIG. 1, the feedback diodes 8, 9 and 11 are arranged in a parallel circuit with their cathode electrodes connected to the cathode of the compensating diode 18. In series with the feedback diode 8 is a feedback resistor 59 and an adjustable resistor 4, in series with the feedback diode 9 is a feedback resistor 61 and an adjustable resistor 6, in series with the feedback diode 11 is a feedback resistor 62 and an adjustable resistor 7. To adjust the break points, three potentiometers 87, 88 and 89 are connected in parallel to the output terminals of a regulated direct current supply 63.

The direct current supply 63 includes a secondary winding 64 as part of the transformer 37. A bridge consisting of diodes 66, 67, 68 and 69 rectifies the A.C. voltage of the secondary winding 64 and generates a pulsating current signal. A filter capacitor 71 smooths out the pulsating voltage of the bridge and produces a D.C. voltage. Two series connected diodes 72 and 73, in conjunction with a bias resistor 74, develop the necessary base bias for a transistor 76. The transistor 76 functions as a constant current source for the base bias to transistor 78 and the collector bias for a transistor 79. Transistor 78 is a power stage which develops a constant voltage across three series connected dropping resistors 81, 82 and 83. These serially arranged dropping resistors connect to the emitter electrode of transistor 78 and the negative terminal of the filter capacitor 71. The dropping resistor 82 is of an adjustable type and has a wiper arm direct coupled to the base electrode of the transistor 79. Transistor 79 functions to amplify the difference between the voltage drop across a Zener diode 80 and the voltage at the wiper arm of the resistor 82. In the circuit as shown, transistor 79 provides the bias voltage for the base electrode of transistor 78. A change in the wiper arm voltage of resistor 82 results in a change in the base bias to the transistor 78. This causes a change in the collector-emitter current flow through the transistor 78 and restores the wiper arm voltage of resistor 82 to a desired level. Two high frequency stabilizing capacitors 84 and 86 provide stabilization of the power supply 63. Capacitor 84 shunts the base-collector electrodes of the transistor 79 and the capacitor 86 shunts the emitter-collector junction of the transistor 76.

Thus, the regulated direct current supply 63 generates a D.C. voltage between the emitter electrode of the transistor 78 and the negative terminal of the bridge. Connected to the regulated direct current supply 63 are three parallel-connected potentiometers 87, 88 and 89. The wiper arm of potentiometer 87 is in series with the adjustable resistor 4 and provides a means for adjusting the first break point in the output signal. Potentiometer 88 has a wiper arm in series with the adjustable resistor 6 and completes the second feedback network for establishing the second break point. Potentiometer 89 has a wiper arm in series with the adjustable resistor 7 to adjust the third output signal break point. A voltage divider circuit, including the input bias resistor 17, the output bias resistor 16, and dropping resistors 91 and 92, also connects to the regulated direct current supply 63.

The function generator of FIG. 4 operates in accordance with the principles discussed with reference to FIGS. 1, 2 and 3. Both the input and output signal are biased by the regulated direct current supply 63 as discussed in FIG. 2. The regulated supply also provides the bias voltages for the feedback diodes to establish the various break points as discussed in the description of FIG. 1. Temperature compensation of the feedback network, as discussed with reference to FIG. 3, is accomplished by means of the compensating diode 18 in series with each of the feedback diodes 8, 9 and 11.

The system of FIG. 4 produces an output signal with a decreasing slope characteristic, that is, as the input signal increases from the zero percent of range level the closed loop amplifier gain $E_o/E_{in}$ decreases. To develop an output having an increasing slope characteristic it is only necessary to make a few minor circuit changes. The output resistor 57 will be connected to the cathode electrode, instead of the anode electrode, of the compensating diode 18. The feedback diodes will be changed from the cathode electrode to the anode electrode of diode 18. In addition, the polarity of the regulated supply 63 and the polarity of the feedback diodes 8, 9 and 11 must be reversed. The necessary changes to the feedback diodes and the compensating diode are shown in FIG. 4A.

In accordance with the patent statutes, I have described my invention in terms of a preferred embodiment. Many changes can be made in both the components and their connection without departing from the scope of my invention as set forth in the accompanying claims.

What I claim as new and desire to secure by Letters Patent of the United States is:

1. A function generator having a preselected transfer characteristic for input signals varying plus and minus of zero, comprising:

a direct current amplifier having an input and an output signal;

a direct current supply connected to the input of said amplifier, said supply generating both a fixed voltage to be added to the input signal before amplification by said direct current amplifier and a fixed voltage to be subtracted from the output signal;

a feedback resistor having one of its terminals connected to the output of said amplifier for proportionally relating the output signal with the input signal, said feedback resistor having the other of its terminals connected to said direct current supply thereby subtracting a fixed voltage from the output signal of said amplifier; and a first feedback diode connected to the output of said amplifier to change the proportional relationship between the amplifier output and input when in a conducting state, said feedback diode connected to said direct current supply to back-bias said diode below a predetermined amplifier output.

2. The function generator of claim 1 including temperature compensating means connected to the output of said amplifier in series opposition with said feedback diode and in series with said feedback resistor to minimize the effect of a temperature change on said feedback diode.

3. The function generator of claim 2 wherein said temperature compensating means includes a compensating diode connected to the output of said amplifier and in series opposition with said feedback diode.

4. The function generator of claim 1 wherein said direct current supply forward-biases said feedback diode below a predetermined amplifier output.

5. The function generator of claim 1 including a plurality of like poled feedback diodes connected in parallel with said first feedback diode, each of said plurality of feedback diodes connected to the output of said amplifier to change the functional relationship between the output signal and input signal when in a conducting state, each of said plurality of diodes connected to said direct current supply to back-bias said diodes below predetermined levels of amplifier output.

6. The function generator of claim 5 wherein said direct current supply forward-biases said feedback diodes below predetermined levels of amplifier output.

7. A function generator, comprising:

a voltage source generating an input signal varying plus and minus of zero;

a direct current supply connected to said voltage source for adding a fixed voltage to the input signal generated by said source;

a first differential amplifier connected to said direct current supply to amplify said input signal plus fixed voltage;

a second differential amplifier connected to said first differential amplifier to further amplify the input signal plus fixed voltage;

a power amplifier connected to said second differential amplifier to generate an output signal related to the input signal plus fixed voltage; and a feedback circuit connected to said power amplifier for inter-relating the output signal with the input signal generated by said voltage source, said feedback circuit connected to said direct current supply to subtract a fixed voltage from the output of said amplifier.

8. The function generator of claim 7 wherein said first and second differential amplifiers include two differentially-connected transistors and said power amplifier includes a transistor having a base electrode connected to the output of said second differential amplifier and a collector electrode connected to said feedback circuit.

9. The function generator of claim 8 including a compensating diode connected to the collector electrode of said power transistor and to said feedback circuit to compensate for temperature effects on said feedback circuit.

10. A function generator, comprising:

a voltage source generating an input signal varying plus and minus of zero;

a regulated direct current supply generating a fixed voltage signal;

a voltage divider circuit including four serially-arranged resistors connected to said regulated supply, said voltage source connected to the junction of the third and fourth resistors of said voltage divider to add a fixed voltage to the input signal generated by said source;

a first differential amplifier connected to the second and third resistors of said voltage divider to amplify said input signal plus fixed voltage;

a second differential amplifier connected to said first differential amplifier to further amplify the input signal plus fixed voltage;

an output transistor for generating an output signal, said transistor having a base, emitter and collector electrode, the base electrode connected to the output of said second differential amplifier;

an output circuit connected to the collector electrode of said output transistor;

a feedback resistor connected to the collector electrode of said output transistor for proportionally relating the output signal to the input signal plus fixed voltage, said feedback resistor connected to the junction of the first and second resistors of said voltage divider to subtract a fixed voltage from the output signal;

a potentiometer having end terminals connected to said regulated direct current supply; and a first feedback diode connected to the collector electrode of said output transistor to change the proportional relationship between the output signal and the input signal plus fixed voltage when in a conducting state, said feedback diode connected to the wiper arm of said potentiometer to back-bias said diode below a predetermined output signal.

11. The function generator of claim 10 including a plurality of potentiometers connected in parallel with said first potentiometer to said regulated direct current supply, and a plurality of feedback diodes connected in parallel with said first feedback diode, each of said plurality of feedback diodes connected to the collector electrode of said output transistor to change the functional relationship between the output signal and the input signal plus fixed voltage when in a conducting state, each of said plurality of diodes connected to one of said plurality of potentiometers to back-bias said diodes below predetermined levels of output signal.

12. The function generator of claim 11 wherein each of said feedback diodes is forward-biased below predetermined levels of output signals.

13. A function generator having a preselected transfer characteristic for input signals varying plus and minus of zero, comprising:

a direct current amplifier having an input and an output signal;

common means for adding a fixed voltage level to the input signal before amplification and for subtracting a fixed voltage level from the output signal;

means for proportionally relating the output signal with the input signal connected to said common means; and means for changing the proportional relationship between the output and input signals also connected to said common means to nullify the effect of said changing means when said amplifier output is below a predetermined level.

14. The function generator of claim 13 including temperature compensating means connected to the output of said amplifier in series opposition with said proportional changing means and in series with said proportional relating means to minimize the effect of a temperature change of said proportional changing means.

15. The function generator of claim 14 including power amplifying means connected to the output of said amplifier and having an output connected to said proportional relating means, said proportional changing means and said temperature compensating means.

16. The function generator of claim 15 wherein said proportional changing means includes a plurality of like poled feedback diodes connected in parallel between the output of said power amplifying means and said common adding and subtracting means to change the functional relationship between the output and input signal when in a conducting state and to back-bias said diodes below predetermined levels of amplifier output.

17. The function generator of claim 16 wherein said plurality of like poled feedback diodes are back-biased by said common means and said temperature compensating means is forward-biased by said common means to generate either an increasing or a decreasing transfer characteristic slope.

18. The function generator of claim 17 including means for reversing the terminals of said plurality of like poled feedback diodes, of said common means and of said temperature compensating means to generate a reversed transfer characteristic slope.

References Cited

UNITED STATES PATENTS

| | | | |
|---|---|---|---|
| 2,906,933 | 9/1959 | Magnin ------------ | 235—197 |
| 3,135,873 | 6/1964 | Werme ------------ | 307—229 |
| 3,329,836 | 7/1967 | Pearlman et al. ----- | 307—229 |

ARTHUR GAUSS, *Primary Examiner.*

B. P. DAVIS, *Assistant Examiner.*

U.S. Cl. X.R.

328—142